United States Patent [19]
Bennett et al.

[11] Patent Number: 6,023,711
[45] Date of Patent: *Feb. 8, 2000

[54] SYSTEM AND METHOD FOR FLEXIBLE FILE ENCAPSULATION THROUGH LATENT LEVELS OF ISOLATION

[75] Inventors: Craig A. Bennett, Boca Raton; Gerald B. Cullen, Plantation; Christopher J. Monahan, Boca Raton; James R. Schoech, Lake Worth; Deirdre Smith, Boca Raton, all of Fla.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/486,029

[22] Filed: Jun. 8, 1995

[51] Int. Cl.[7] .................................................. G06F 12/08
[52] U.S. Cl. .......................................... 707/205; 709/303
[58] Field of Search ...................................... 395/616, 621; 707/1, 200, 201, 205, 511; 711/202–209; 709/300, 303

[56] References Cited

U.S. PATENT DOCUMENTS

| | | | |
|---|---|---|---|
| 5,006,983 | 4/1991 | Wayne et al. ................................ | 705/8 |
| 5,452,447 | 9/1995 | Nelson et al. ............................ | 395/621 |
| 5,530,799 | 6/1996 | Marsh et al. ............................. | 395/164 |
| 5,561,799 | 10/1996 | Khalidi et al. ............................ | 395/616 |
| 5,729,710 | 3/1998 | Magee et al. ............................ | 395/413 |
| 5,842,226 | 11/1998 | Barton et al. ............................ | 711/203 |

Primary Examiner—Alvin E. Oberley
Assistant Examiner—St. John Courtenay III
Attorney, Agent, or Firm—Jeffrey S. LaBaw, Esq.; Morgan & Finnegan, L.L.P.

[57] ABSTRACT

A method, program, and system provide flexibility when a PFS requests a memory object reference from a File Server's Pager so that it can map the object in memory. The PFS supplies a reference in return that allows the pager to obtain a mapping of a data region within that memory object, the mapping being a layout of a region in that memory object. The method divides functions performed by a general purpose pager into function-subsets and associates the function-subsets with a set of flags passed in on an original memory object reference request. The method then integrates the functions required by the pager for that specific memory object to become part of the object's pager attributes and links the set of flags to a set of PFS call-back functions that represent customized functions that the PFS selectively replaces. In this manner, the PFS can dynamically override a sequence of base methods used to access data on a memory object by memory object basis.

12 Claims, 5 Drawing Sheets

WRITE PROCESS 500

READ PROCESS 550

SYSTEM AND METHOD FOR FLEXIBLE FILE ENCAPSULATION THROUGH LATENT LEVELS OF ISOLATION

FIELD OF THE INVENTION

The invention disclosed broadly relates to data processing systems and more particularly to improvements in handling of information files in an operating system.

BACKGROUND OF THE INVENTION

Related patent applications:

The invention disclosed herein is related to the co-pending U.S. patent application by Hardeep Singh, et al., entitled "Backing Store Management Method and Apparatus for a Microkernel Dataprocessing System", Ser. No. 08/303,851, filed Sep. 9, 1994, IBM Docket No. BC9-94-087, assigned to the IBM Corporation and incorporated herein by reference.

The invention disclosed herein is related to the co-pending United States Patent Application by Guy G. Sotomayor, Jr., James M. Magee, and Freeman L. Rawson, III, which is entitled "METHOD AND APPARATUS FOR MANAGEMENT OF MAPPED AND UNMAPPED REGIONS OF MEMORY IN A MICROKERNEL DATA PROCESSING SYSTEM", Ser. No. 08/263,710, now U.S. Pat. No. 5,729,710, filed Jun. 21, 1994, IBM Docket Number BC9-94-053, assigned to the International Business Machines Corporation, and incorporated herein by reference.

A primary goal of the client-server movement has been to encapsulate and simplify the separate elements that comprise a system environment. This encapsulation and generalization of common system elements allows for significant function reuse, and reduces the effort involved with the addition of a new feature such that only the unique aspects of the feature must be implemented.

An example of this can be found in the file server implementation of the IBM WorkPlace Operating System (WPOS) product. This file server is actually broken into three separate components as follows:

The Logical File Server (LFS): This piece of the file server performs the initial message/request processing, the basic thread control, and the resource management required by all file systems. It also provides a layer of isolation from the external interface for the file system(s) it supports.

The Physical File System (PFS): Data can be arrayed in a storage system in a wide variety of permutations, with each format exhibiting different archive and access characteristics. A physical file system (PFS) is the part that interprets the format of the data in a storage system such that it can be accessed as distinct files or directory control structures. In this text, any such grouping of data will be called a data set. Some well known examples of these interpreters are the file allocation table file system (FAT), high performance file system (HPFS), and the journaling file system (JFS). Each of these examples would require their own PFS to interpret their specific data format in the workplace OS file server. The logical file server is designed to service one or more PFS.

The most elemental task of a PFS is to determine and track the physical location of a data set on a storage device. A special array of structures is used to associate the physical location of data with the offset of that data into the data set. This array is referenced in this text as the layout for that data.

The file server's pager: Systems like the IBM microkernel and the MACH kernel provide a method for accessing persistent data through a file system as regions within the requesting client's memory address space. The kernel provides a special interface through which it can manipulate this virtual memory, called the external memory manager interface (EMMI). Accessing data in this fashion is known as mapping. These methods are well known in the industry.

The file server's pager manages the EMMI for any PFS supported by the file server. A PFS must register a data set with the file server's pager so it can create a memory object port for each data set and initialize the structures required for paging activity. A memory object port is a kernel construct used to identify and access pagable entities in the system. The file server's pager reduces the complex interaction across the EMMI to a simpler exchange with the PFS, and provides a layer of isolation between the PFS and the specific device interfaces.

What is needed in the prior art is an improved interface between the file server's pager and the physical file system. Through this interface, the file server would be able to reap the benefits of a separation between the file system and the file server's pager without suffering from the limitations that arise from such an architecture.

OBJECTS OF THE INVENTION

It is therefore an object of the invention to provide an improved interface between the file server's pager and the physical file system.

SUMMARY OF THE INVENTION

These and other objects, features and advantages are accomplished by the invention. The invention involves the concept of latent levels of isolation. Latent levels of isolation is an interface between a file server's pager and the physical file system that it supports, which provides several levels of function with increasing degrees of isolation. The invention enables the system to select which level applies to a data set at the time it is registered. When registering a data set, the system must supply a pointer to a function that will process layout requests for that data set during subsequent paging activity involving the data set. Along with this function pointer, the system will specify the level of isolation required. This informs the pager where in the sequence of paging activity the supplied function must be inserted. The pager supplies a default set of functions for any step the system has selected to not take part through the selection of an isolation level. Each level of isolation is represented by a specific interface defined by the pager. This enables the system to select the level of isolation it requires without being restricted to a single level.

The invention breaks down the functions performed by the general purpose pager and associates the function-subsets with a set of flags passed in the original memory object reference request. The functions required by the pager for that specific memory object then become part of its pager attributes. The set of flags are linked to the set of PFS call-back functions that represent those that the PFS has selected to replace.

From an object-oriented viewpoint, the memory object maintains a set of methods associated with its manipulation. This set of methods is executed in a fixed sequence to service the requests for data transfer. This interface allows the caller (the PFS) to dynamically override the sequence or base methods used in this process—on a memory object by memory object basis. It can additionally allow the caller to completely override the process for selected memory objects.

DISCUSSION OF THE PREFERRED EMBODIMENT

Figure 1:
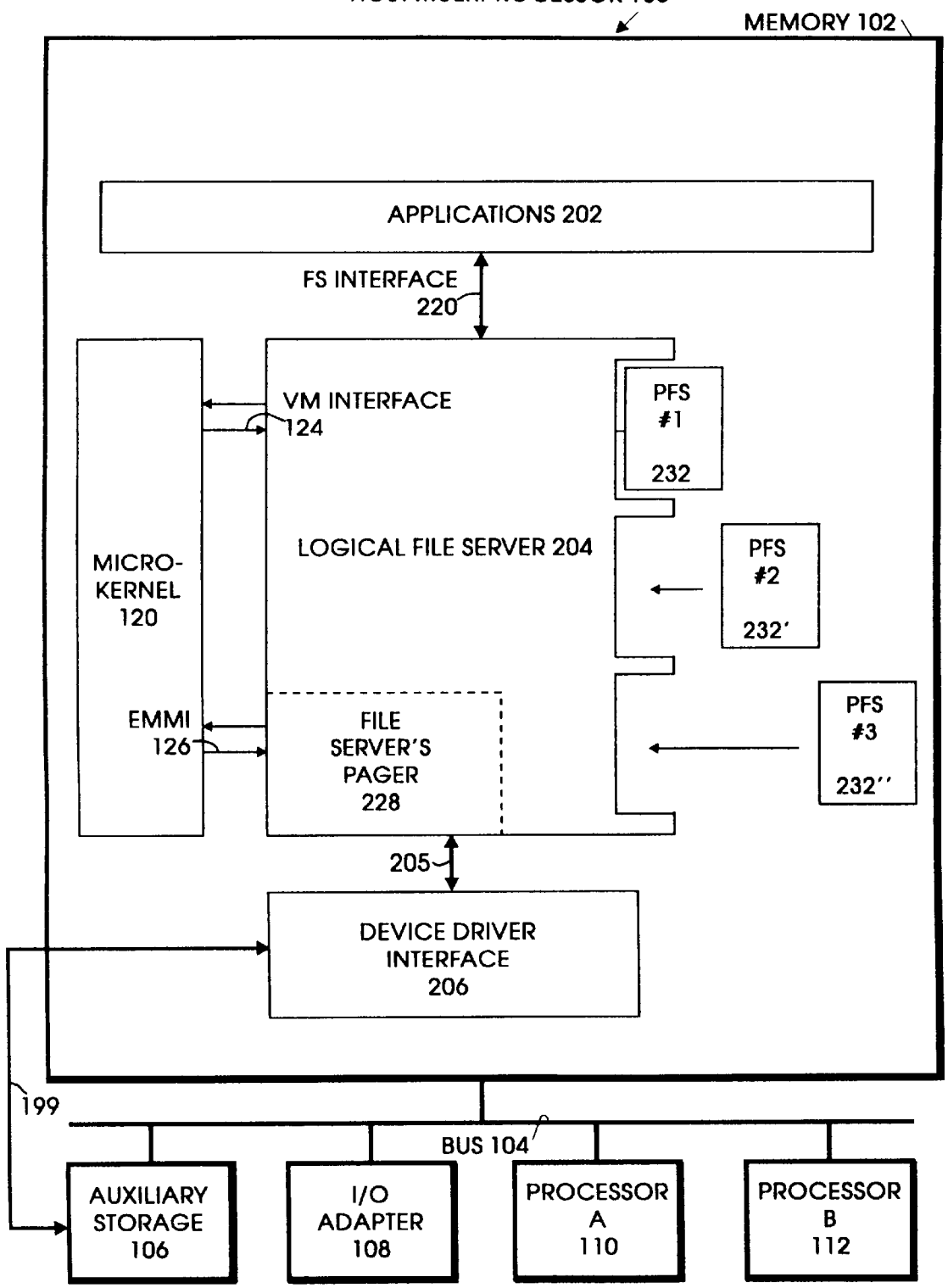
FIG. 1 is a functional block diagram of the host multiprocessor in accordance with the invention.

WPOS Overview:

This is quick review of the WorkPlace Operating system (WPOS).

It is intended as background for the invention Flexible File System Encapsulation through Latent Levels of Isolation, and thus may only lightly cover some aspects that are less pertinent to the subject at hand. It is an overview that provides a common base from which further discussion can expand.

The IPL Process:

The sequence that occurs at Initial Program Load (IPL) is as follows:

1. When the system is powered-on, it automatically executes a set of code that was loaded into non-volatile storage at time of manufacture. This code is referred to as the firmware.

2. The firmware walks through a predetermined list of devices, reading from each device, and identifies the device that contains the operating system to be used on this IPL.

3. Once this device is identified, a basic loading portion of the operating system is read from the device and execution then branches to that code.

4. In WPOS, this loader code reads a configuration file called BOOT.CFG. This file contains a list of the programs that must be loaded and/or executed for the system to complete IPL.

5. Programs that provide basic access to devices are called Device Drivers. Programs that provide more complex services are called Servers. The interfaces (program calls) these programs make available are generically referenced as the Application Programmer's Interfaces (API) for that program.

In the client-server world, one will find that the interaction between servers can become quite layered, with servers using servers that use yet more servers.

6. The programs listed in the BOOT.CFG will start with the IBM microkernel itself, and then the servers and device drivers that are required to run the complete system environment. As each server is referenced in this list, one may wish refer to the description of that server provided below.

7. The Name Server is executed first and the name space is made available to the system.

8. The Basic Volume Manager is executed, and a list of the accessible volumes is made available in the name space.

9. The File Server loads next, and awaits a request to mount one of the accessible volumes.

10. The Personality Server is then executed, which selects the volumes to mount and creates the user interfaces to the system.

The Name Server:

As reflected in the IPL process, the Name Server is one of the first servers to be loaded. It maintains a globally accessible data area that other servers can use to store generally useful data and the ports a program must use to talk to those servers. A port is a simple communication mechanism that is used as a conduit between programs. The industry (the client-server parts of it) has formalized the process of communication between programs using these ports and a standardized set of program calls. This program-to-program communication method is called the Inter-Process Communication (IPC) method. Since a mechanism that automatically generates the IPC interface called the MACH Interface Generator (MIG) is widely used to manage IPC, one may often hear IPC interfaces called MIG interfaces.

Ports to other servers (and other data) are stored in the global data area maintained by the Name Server. This data area is called the Name Space. It is organized in a hierarchical structure much like the directories on a fixed disk. In this way different types of data can be grouped into related sets.

Each entry in the name space is called a node. Nodes that are used as links to get to other nodes are called branch nodes or internal nodes. Nodes that simply hold data, and are not used to link other nodes, are called leaf nodes. Nodes each have a unique name, and may have other data associated with it called the attributes of that node.

The Basic Volume Manager (BVM):

This server is also loaded early in the IPL process. It manages the accessible volumes available to the system. Any given storage device may be broken into several different logical subsets of storage by the system. This method is referred to as partitioning disks, and each subset of storage is called a volume or a partition. DOS and OS/2 users access volumes as drive letters (i.e. one 540 Meg drive be accessed as a C:<300 Meg> and D:<240 Meg>).

The BVM reads from the storage devices installed on the system and identifies the set of volumes that they comprise. It also identifies the nature of the storage devices and the file system (described later) required to access the volumes. It creates a separate node in the name space for each volume it identifies and creates attributes for that node containing the data associated with that volume.

The File Server:

The File Server manages the data that is stored on the different volumes attached to the system. It is broken into three areas of function as follows:

The Physical File Systems

The Logical File Server

The File Server's Pager

The Physical File Systems (PFS):

Data is organized and stored on a volume in one of wide variety of methods. The method used for any given volume is called the format of that volume. Each different format requires a special program to interpret the data management structures and re-assemble the pieces of data stored in different places on the volumes into the data files required by the user. These programs are generally called File Systems in the industry.

Several common file systems that are widely used are the File Allocation Table (FAT) file system, the High Performance File System (HPFS), and the Journaling File System (JFS).

The file systems under WPOS that manage the physical media as a subcomponent of the File Server are called Physical File Systems for clarity.

The Logical File Server:

As previously mentioned, there is a wide variety of file systems available in the industry. It is in the interest of the WPOS to support as broad a spectrum of these as possible.

To further this goal, the File Server architecture was designed with the intent that only the unique elements of any given file system need be implemented for it to be incorporated as a part of the File Server. A well-defined PFS interface and dynamic load capabilities allow for previously unsupported file systems to be post-fitted into the File Server component. With these features, multiple disparate file systems can function concurrently under WPOS File Server framework.

The Logical File Server provides a single user interface to the multiple file systems that the File Server supports, manages the basic system communication tasks, and supplies many of the functions that are common to all file systems.

The File Server's Pager:

One mechanism that makes the PFS implementers job easier is the nature of device I/O in the WPOS File Server. The File Server offers a built-in External Memory Manager or Pager that does the majority of the device driver interfacing for the PFS, and allows the PFS to use memory mapped I/O (described later) to access the storage device. Memory mapped I/O enables a PFS to manipulate persistent storage (disk space) in the same natural manner as dynamic storage (RAM). It also allows the PFS to take advantage of the inherent caching capabilities of the microkernel, freeing it from having to implement its own cache. A section covering the interaction between the File Server's Pager and the PFS is included later in this document under Pager/PFS interaction.

Personality Servers:

Once the basic services are in place, the system must create a receptive environment for the user and the user's programs. A problem arises in that there is a wide range of these environments that users have grown accustomed to, each developed as the external interfaces to dedicated operating systems. One of the key elements in the WPOS architecture is the separation of the details of this environment and the basic function of the system. In this way there can be multiple operating environments all using a common core of operating services, and the details of the environment can be dynamically changed to suit the needs of the user without redoing the core function. Each of these specialized environments is referred to as a system personality, and in WPOS, the server that manages the details of that environment is called the Personality Server. The dominant personality under WPOS is that of OS/2, so the personality server most commonly referenced is the OS/2 Server.

Important File Server Concepts:

Mounting Volumes:

For various system reasons, only a subset of the complete set of volumes on the system may need to be managed at any given time. Since this determination is made outside of the File Server, it allows external parties to tell it what volumes must be managed. the File Server is instructed to begin managing a volume through the MOUNT API. Each MOUNT request tells the File Server to access and manage a single volume, and the processing of that API is referredto as mounting the volume in question. The File Server must be told in the MOUNT request the BVM node and the Physical File System applicable for the volume being mounted.

Memory Mapped I/O:

Memory mapped I/O is a general term applied to the concept of accessing persistent storage (disks, etc.) as ranges of memory in a tasks address space. Offsets in these ranges of memory are mapped to data appearing on a storage device, and as memory in these ranges are accessed, the data accessed is transferred to/from the storage device. In reality, the data is transferred to/from RAM memory, and then that memory is used to back the memory ranges, but the overall effect in generally the same. The RAM memory used for this purpose ends up serving as an effective data cache for the devices in question.

Memory Objects:

Though many are not aware of it, users seldom wish to access storage devices in a strictly sequential fashion. Even if the user perceives a data file as a single sequence of bytes, file systems often break the user's data into multiple pieces so that they can best take advantage of the available free space on the storage devices. File systems also store special structures on the devices that associate the different pieces so that the sequential set of bytes that represent the user's file can be reconstructed later. The file system also places other data on the disk that reflect certain aspects of the file such as the date the file was created or the level of access permitted on that file. All of the data that the file system maintains that doesn't represent user's data is referred to as that file's meta data. A file system's meta data may also be broken-up and spread-out across the disk to meet resource or performance constraints.

This fracturing of the data leads to the concept of a memory object.

It would be of little use to memory map an explicit region of the disk if that region only contains a small piece of the data that the caller wants to access. A memory object is a single reference to a set of data on a storage device that the caller wants to have mapped into a single region of memory. The caller does not care how the data is broken-up on the disk, but rather wants all of the little pieces reconstructed so that the data can be accessed as a sequential stream of bytes in memory.

The Pager and the EMMI:

The IBM microkernel supports the concept of a memory object and provides support for memory mapped I/O through a virtual memory function called vm_map(). The microkernel, like the caller, also does not care how the data within the memory object is obtained. To support the vm_map() call, the microkernel talks to a specialized program we mentioned earlier called the External Memory Manager or Pager. It only refers to the memory object in question with offsets and lengths within the memory object to reference the data. The interface defined by the microkernel to talk with pagers is called the External Memory Manager Interface (EMMI). This interface is well defined and standardized so that third parties can create multiple external pagers for a variety of storage/access needs.

A question may arise along the lines of "How does the microkernel know which pager to talk to for a given memory object?". Part of the memory object reference used in the vm_map() call is actually a port that leads to the pager that owns that memory object. The port was created for the caller by that pager prior to the vm_map() call. So, in order to map an object, the following must be in place:

1. A pager must be in place and responding to the EMMI
2. A memory object reference must be obtained from that pager
3. A vm_map() call must be issued specifying the offset and length of the desired data in the memory object.

Once this sequence has occurred, the memory mapped region will be available to the caller.

File Server's Pager/PFS interface:

As we said earlier, one of the important features that the WPOS File Server framework provides to the PFS implementer is a built-in pager. This allows for the PFS to map files and meta-data elements as memory objects in their address space, and greatly simplifies the code required to support the PFS API set. This does not, however, divorce the PFS from maintaining the association of the data in the memory object to the data on the storage device—it simply saves the PFS overhead associated with interfacing with the device driver interfaces and the EMMI. When a PFS requests a memory object reference from the File Server's Pager so that it may map the object in memory, it must supply a reference in return that allows the pager to obtain a mapping of a data region within that memory object. This mapping is called a layout of a region in that memory object. The nature of this interface is the heart of this invention.

The original design had a fixed interface for the call-back to the PFS that simply supplied the offset and length of the data in the memory object and accepted a layout on return. This design was only functional for conventional PFS implementations and conventional storage devices. Many of the more exotic PFS implementations or exotic devices would never fit into this interface. So by encapsulating a fixed set of functions into the PFS, they prevented a subset of the possible PFS implementations. Additionally, the fixed interface disregarded some of the advantages that can be achieved for devices that have simplistic layouts that seldom change—for these a layout can be supplied immediately on the memory object reference was requested in the first place, and no call-back would be required at all (fixed layout).

The method used to allow flexibility on this interface is to break-down the functions performed by the general purpose pager and associate the function-subsets with a set of flags passed in on the original memory object reference request. The functions required by the pager for that specific memory object then become part of its pager attributes. The set of flags would be linked to the set of PFS call-back functions that represent those that the PFS have selected to replace.

From an object-oriented viewpoint, the memory object maintains a set of methods associated with its manipulation. This set of methods is executed in a fixed sequence to service the requests for data transfer from the EMMI. This interface allows the caller (the PFS) to dynamically override the sequence or base methods used in this process—on a memory object by memory object basis. It can additionally allow the caller to completely override the process for selected memory objects.

FIG. 1 shows a host multiprocessor 100, which incudes a memory 102 connected by means of a bus 104 to an auxiliary storage 106, an I/O adapter 108, a first processor A110, and a second processor B112. Contained within the memory 102 are applications 202, an FS interface 220, a logical file server 204, the microkernel 120, and the device driver interface 206. The FS interface 220 exchanges data between the applications 202 and the logical file server 204. The VM interface 124 and the EMMI interface 126 exchange information between the logical file server 204 and the microkernel 120. Interface 205 exchanges information between the file server's pager 228 and the device driver interface 206. The device driver interface 206 is shown functionally connected over path 199 to the auxiliary storage 106. Auxiliary storage 106 may be any of a variety of storage media such as a floppy disk drive, a moving magnetic medium hard drive, an optical medium read only device, write once read many optical device or other suitable storage device.

In accordance with the invention, the plurality of customized PFS units 232, 232', and 232" can be selectively coupled with the logical file server 204, to provide a customized operations for the file server's pager 228 when interacting with a variety of auxiliary storage devices 106.

Figure 2:
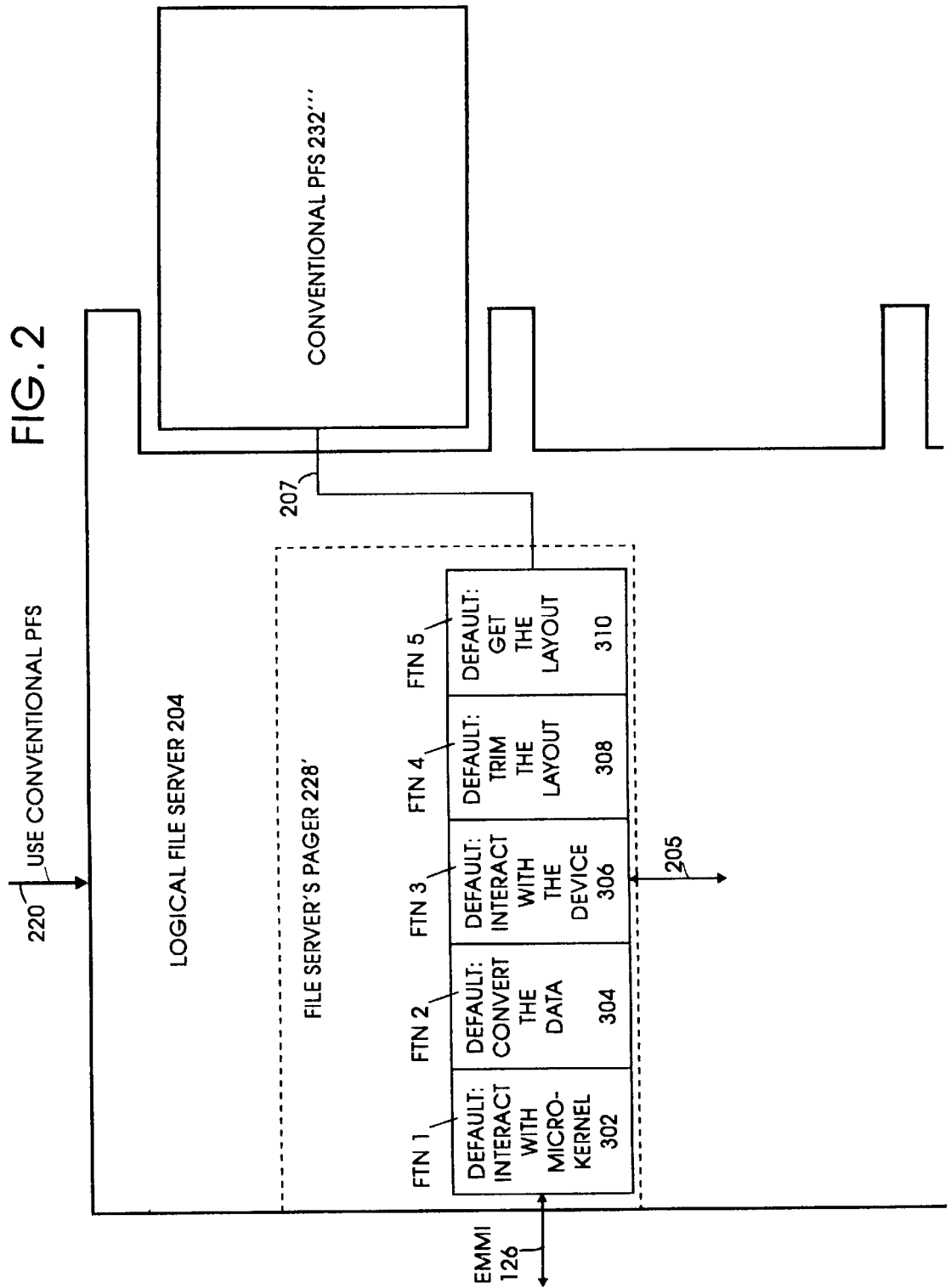
FIG. 2 is a more detailed depiction of the logical file server, file server's pager, and conventional PFS.

Turning now to FIG. 2, a more detailed illustration is given of the invention. In FIG. 2, the logical file server 204 is provided with a file server's pager 228' which contains a series of five default functions for performing file accesses to various file media. Function 1 is a default interact with microkernel 302, Function 2 is a default convert the data 304, Function 3 is a default interact with the device 306, Function 4 is a default trim the layout 308, and Function 5 is a default get the layout 310. As is shown in FIG. 2, if a conventional PFS 232''' is coupled by means of the path 207 to the file server's pager 228', it will provide for default access methods when the logical file server 204 interacts over path 205 with the auxiliary storage 126.

Figure 5A:
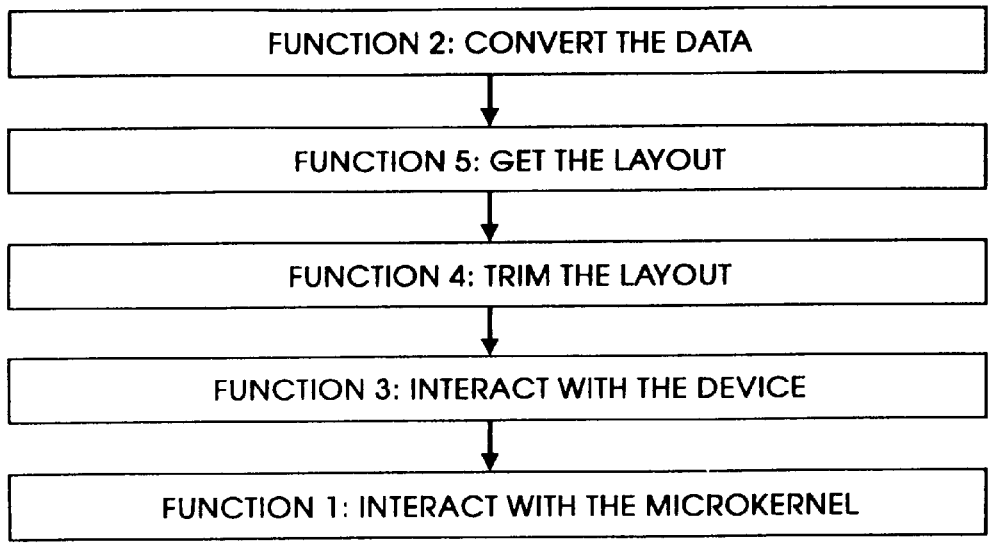
FIG. 5(a) is a flow diagram of a write process.

Turning now to FIG. 5(a), when the file server's pager 228' chooses to perform a write process 500, it will perform the steps as is illustrated in FIG. 5(a). In particular, it will sequentially convert the data and in doing this will call Function 2 which is the default function 304 stored in file server's pager 228'. It will then get the layout which is Function 5 which is the default function 310 stored in the file server's pager 228'. It will then trim the layout which is Function 4 which is the default function 308 stored in the file server's pager 228'. Trim the layout is Function 4. Then in FIG. 5(a) the method will interact with the device which is Function 3 which is the default function 306 stored in the file server's pager 228'. Then the method of FIG. 5(a) will interact with a microkernel which is Function 1 which is the default function 302 stored in the file server's pager 228'.

Figure 3:
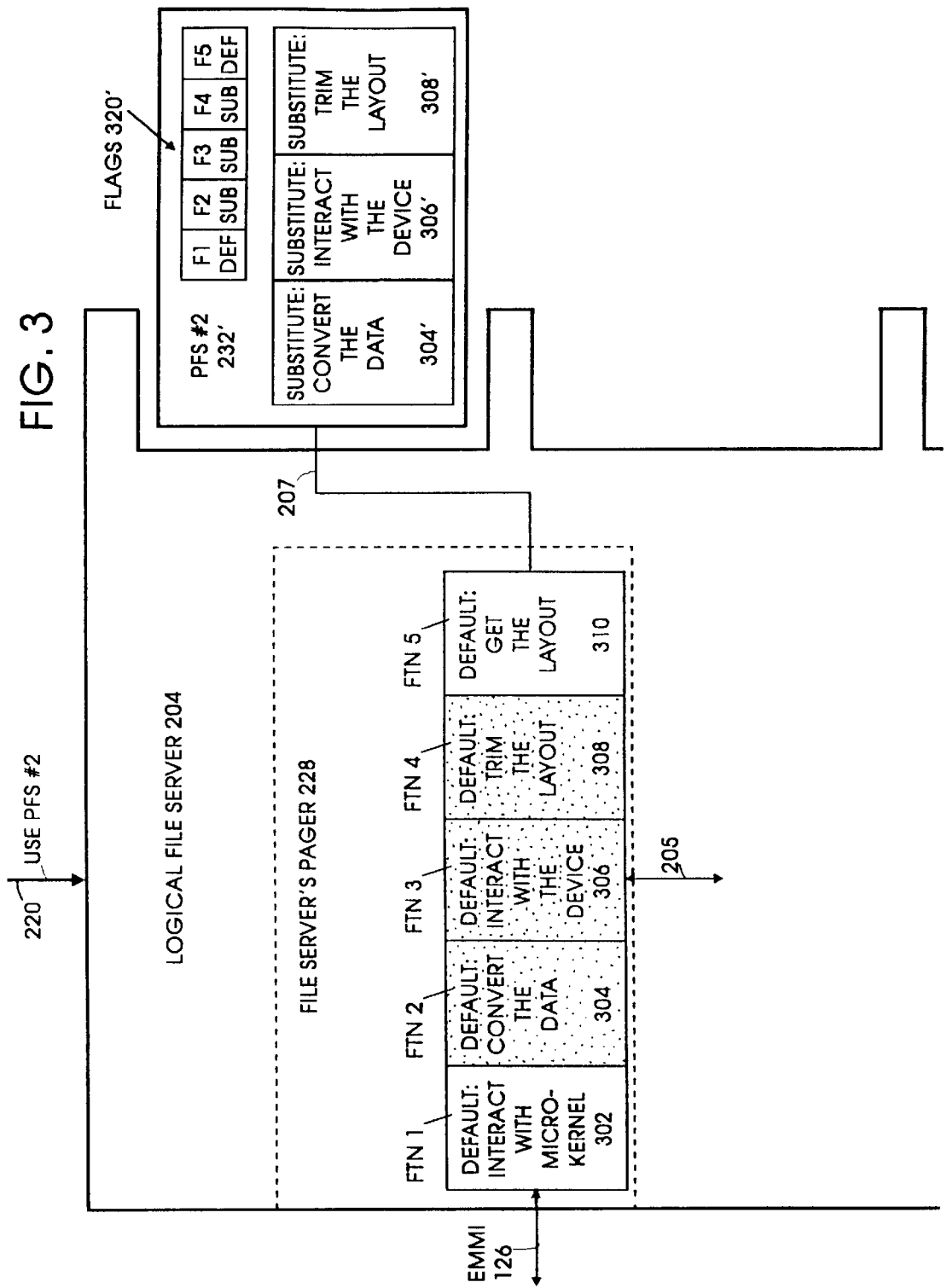
FIG. 3 is a more detailed depiction of the logical file server, file server's pager, and PFS, in accordance with the invention, showing a first example.

Turning now to FIG. 3, the invention as shown which provides for customizing and allowing the PFS 232', for example, to customize the operations performed by the file server's pager 228 when interacting with the auxiliary storage device 106. As is shown in FIG. 3, PFS #2 232' includes the flags 320' which identify for each respective Function 1, 2, 3, 4 and 5, corresponding flags F1, F2, F3, F4, F5 which specify whether the default function is to be performed as is stored in 302, 304, 306, 308, 310 of the file server's pager 228, or alternately whether selected substitute functions 304', 306', and 308' are to be substituted for functions F2, F3, and F4. The substitute functions 304', 306' and 308' are provided in the PFS #2 232'.

The substitute function 304' in the PFS #3 232' is the substitute convert the data function, and it substitutes for the convert the data function 304 in the file server's pager 228. The substitute method 306' which interacts with the device shown in PFS #2 232' of FIG. 3, will selectively substitute for Function 3, 306. In the same manner, the substitute trim the layout function 308' in the PFS 232' will selectively substitute for function 4, 308 in the file server's pager 228.

The selection of which particular Functions 1, 2, 3, 4 and 5 will have either default methods from the file server's pager or alternately, will have substitute methods from the PFS 232', is established by the flags 320' in the PFS 232'. Flag F1 provides for the default function which is 302. Flag F2 provides for the substitute function which is 304'. Flag F3 provides for the substitute function which is 306'. Flag F4 provides for the substitute function which is 308'. Flag F5 provides for the default function which is 310.

With the PFS 232' of FIG. 3, the carrying out of the write process of FIG. 5(a) will be as follows:

In the write process of FIG. 5(a) the first step is Function 2 which is convert the data and because the flag F2 in the flags 320' indicates a substitute, it will be the substitute convert the data process 304' provided by the PFS 232'. Continuing in FIG. 5(a), the next step is to get the layout which is Function 5 and the flags 320' provide that F5 is the default and therefore the default get the layout function 310 from the file servers pager 228 will be used. Next, FIG. 5(a) provides for Function 4 which is trim the layout and in this case, the flags 320' for Function 4 provide flag F4 which is a substitute flag and therefore the trim the layout function 308' from the PFS 238' will be employed.

Then FIG. 5(a) for the write process provides for interacting with the device which is Function 3 and flag F3 indicates a substitution and therefore the substitute interacts with the device 306' process will be employed. Then last the process of FIG. 5(a) provides the step of interacting with the microkernel which is Function 1 and flag F1 of the flags 320' of FIG. 3 provides for the default and the default is the interact with the microkernel 302 which is provided by the file server's pager 228.

Figure 5B:
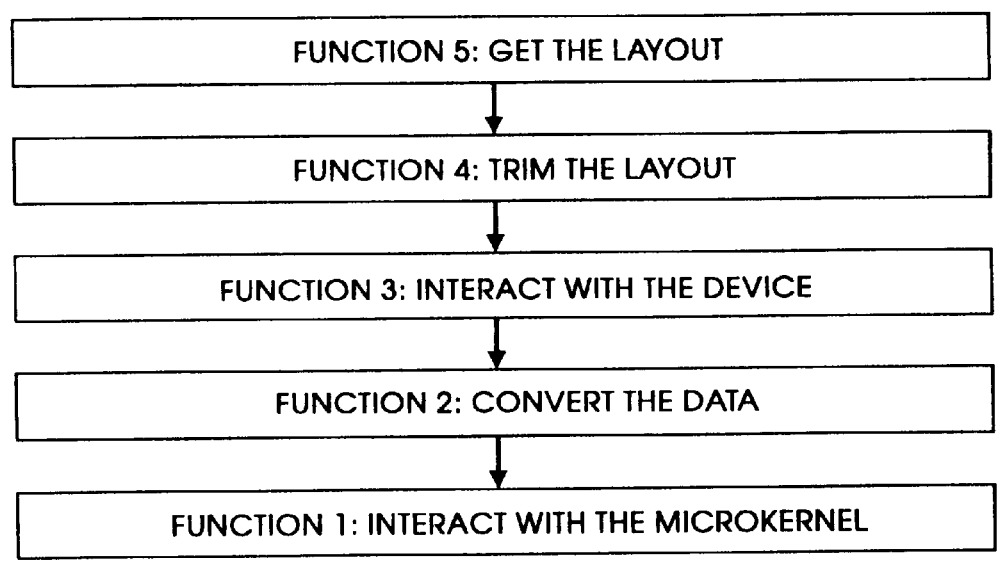
FIG. 5(b) is a flow diagram of a read process.

Now reference to FIG. 5(b) shows the read process 550 which provides for Functions 1, 2, 3, 4 and 5 in a different order in order to carry out a read operation. Get the layout is Function F5 of FIG. 5(b), followed by trim the layout which is Function F4 which is followed by interact with the device which is Function 3 which is followed by convert the data which is Function 2, which is followed by interact with the microkernel which is Function 1.

As can be seen in FIG. 3, the PFS 232' will provide a customized sequence of Function 1 and Function 5 which are default functions used and stored in the file server's pager 228, and will also provide for customized Functions 2, 3, and 4 which are provided by the PFS #2, 232'. Thus, the read process can also be customized by the PFS 232'.

Figure 4:
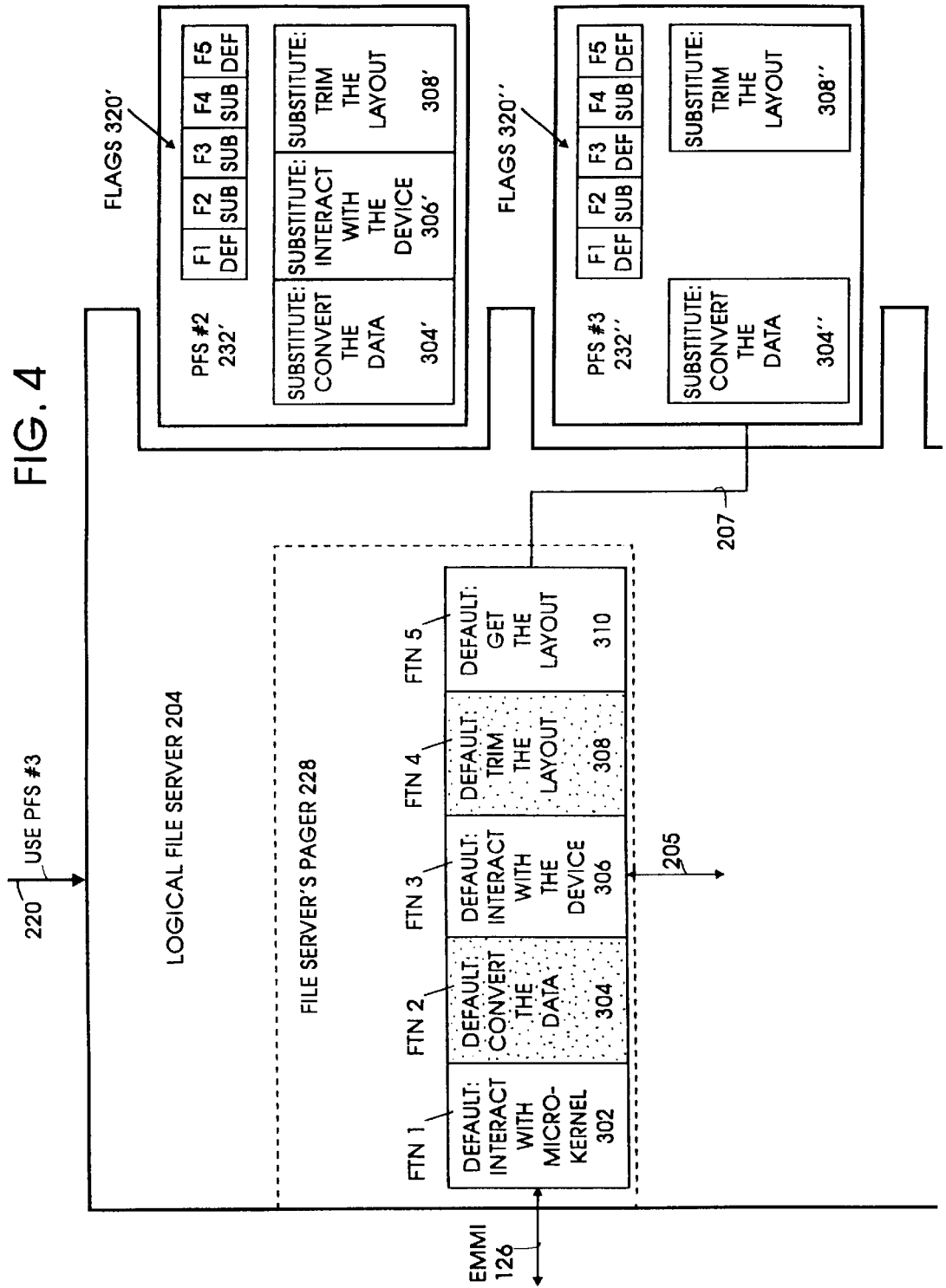
FIG. 4 is an illustration similar to that of FIG. 3, showing a second example.

FIG. 4 shows the ability to use more than one PFS having more than one set of flags and more than one set of substitute processes to substitute for the default processes in the file server's pager 228. As can be seen in FIG. 4, path 207 is connected between a different PFS #3, 232" which connects to the file server's pager 228. The PFS #3 232" provides for a different set of flags 320" which provides for a different combination of substituted and default functions for the file server's pager 228.

Although a specific embodiment of the invention has been disclosed, it will be understood by those having skill in the art that changes can be made to that specific embodiment without departing from the spirit and the scope of the invention.

What is claimed is:

1. A method to provide flexibility when a PFS requests a memory object reference from a File Server's Pager so that it can map the object in memory, the PFS supplying a reference in return that allows the pager to obtain a mapping of a data region within that memory object, the mapping being a layout of a region in that memory object, comprising:

dividing functions performed by a general purpose pager into function-subsets;

associating the function-subsets with a set of function defining flags passed in on an original memory object reference request said flags indicating whether a default pager function-subset or a customized pager function-subset is to be used for the memory object;

integrating the function-subsets required by the pager for that specific memory object to become part of the object's pager attributes;

linking the set of function defining flags to a set of PFS call-back functions that represent said customized function-subsets that the PFS selectively replaces;

providing a set of default access method steps associated with the memory object;

executing the set of method steps in a fixed sequence to service requests for data transfer;

dynamically overriding selected ones of said method steps by substituting said customized function-subsets for said default function-subsets in response to said flags associated with said memory object.

2. The method of claim 1, which further comprises:

maintaining a set of selected default and customized access methods associated with the memory object; and executing the set of methods in a fixed sequence to service requests for data transfer;

whereby the PFS can dynamically override a sequence of base methods used to access data on a memory object by memory object basis.

3. A computer-readable medium of instructions to provide flexibility when a PFS requests a memory object reference from a File Server's Pager so that it can map the object in memory, the PFS supplying a reference in return that allows the pager to obtain a mapping of a data region within that memory object, the mapping being a layout of a region in that memory object, comprising:

means for dividing functions performed by a general purpose pager into function-subsets;

means for associating the function-subsets with a set of function defining flags passed in on an original memory object reference request, said flags indicating whether a default pager function-subset or a customized pager function-subset is to be used for the memory object;

means for integrating the function-subsets required by the pager for that specific memory object to become part of the object's pager attributes;

means for linking the set of function defining flags to a set of PFS call-back functions that represent said customized function that the PFS selectively replaces;

means for providing a set of default access method steps associated with the memory object;

means for executing the set of method steps in a fixed sequence to service requests for data transfer; and means for dynamically overriding selected ones of said method steps by substituting said customized function-subsets for said default function-subsets in response to said flags associated with said memory object.

4. The computer-readable medium of instructions of claim 3, which further comprises:

means for maintaining a set of selected default and customized access methods associated with the memory object; and means for executing the set of methods in a fixed sequence to service requests for data transfer;

whereby the PFS can dynamically override a sequence of base methods used to access data on a memory object by memory object basis.

5. An article of manufacture for use in a computer system, comprising:

a computer usable medium having computer readable program code means for providing flexibility when a PFS requests a memory object reference from a File Server's Pager so that it can map the object in memory, the PFS supplying a reference in return that allows the pager to obtain a mapping of a data region within that memory object, the mapping being a layout of a region in that memory object; and computer readable program code means for causing a computer to perform the steps of:

dividing functions performed by a general purpose pager into function-subsets;

associating the function-subsets with a set of function defining flags passed in on an original memory object reference request, said flags indicating whether a default pager function-subset or a customized pager function-subset is to be used for the memory object;

integrating the function-subsets required by the pager for that specific memory object to become part of the object's pager attributes;

linking the set of function defining flags to a set of PFS call-back functions that represent said customized function-subsets that the PFS selectively replaces;

providing a set of default access method steps associated with the memory object;

executing the set of method steps in a fixed sequence to service requests for data transfer; and dynamically overriding selected ones of said method steps by substituting said customized function-subsets for said default function-subsets in response to said flags associated with said memory object.

6. The computer readable program code means of claim 5, further causing a computer to perform the steps of:

maintaining a set of selected default and customized access methods associated with the memory object; and executing the set of methods in a fixed sequence to service requests for data transfer;

whereby the PFS can dynamically override a sequence of base methods used to access data on a memory object by memory object basis.

7. A computer system to provide flexibility when a PFS requests a memory object reference from a File Server's Pager so that it can map the object in memory, the PFS supplying a reference in return that allows the pager to obtain a mapping of a data region within that memory object, the mapping being a layout of a region in that memory object, comprising:

means for dividing functions performed by a general purpose pager into function-subsets;

means for associating the function-subsets with a set of function defining flags passed in on an original memory object reference request, said flags indicating whether a default pager function-subset or a customized pager function-subset is to be used for the memory object;

means for integrating the function-subsets required by the pager for that specific memory object to become part of the object's pager attributes;

means for linking the set of function defining flags to a set of PFS call-back functions that represent said customized function-subsets that the PFS selectively replaces;

means for providing a set of default access method steps associated with the memory object;

means for executing the set of method steps in a fixed sequence to service requests for data transfer; and means for dynamically overriding selected ones of said method steps by substituting said customized function-subsets for said default function-subsets in response to said flags associated with said memory object.

8. The computer system of claim 7, which further comprises:

means for maintaining a set of selected default and customized access methods associated with the memory object; and means for executing the set of methods in a fixed sequence to service requests for data transfer;

whereby the PFS can dynamically override a sequence of base methods used to access data on a memory object by memory object basis.

9. A computer system to provide flexibility when a PFS requests a memory object reference from a File Server's Pager so that it can map the object in memory, the PFS supplying a reference in return that allows the pager to obtain a mapping of a data region within that memory object, the mapping being a layout of a region in that memory object, comprising:

a memory for storing memory objects and executable instructions;

a bus coupled to said memory for transferring said memory objects and executable instructions;

a processor coupled so said bus for executing said executable instructions;

means coupled to said memory for dividing functions performed by a general purpose pager into function-subsets;

means coupled to said memory for associating the function-subsets with a set of function defining flags passed in on an original memory object reference request, said flags indicating whether a default pager function-subset or a customized pager function-subset is to be used for the memory object;

means coupled to said memory for integrating the function-subsets required by the pager for that specific memory object to become part of the object's pager attributes;

means coupled to said memory for linking the set of function defining flags to a set of PFS call-back functions that represent said customized function-subsets that the PFS selectively replaces;

means coupled to said memory for providing a set of default access method steps associated with the memory object;

means coupled to said memory for executing the set of method steps in a fixed sequence to service requests for data transfer; and means coupled to said memory for dynamically overriding selected ones of said method steps by substituting said customized function-subsets for said default function-subsets in response to said flags associated with said memory object.

10. The computer system of claim 9, which further comprises:

means coupled to said memory for maintaining a set of selected default and customized access methods associated with the memory object; and means coupled to said memory for executing the set of methods in a fixed sequence to service requests for data transfer;

whereby the PFS can dynamically override a sequence of base methods used to access data on a memory object by memory object basis.

11. In a computer memory, a method to customize accessing steps to be performed in an access method by a file server's pager in accessing a data set on a file server for a specific memory object in the memory, the steps being customized at a time that the data set is registered with the file server's pager for association with the specific memory object, the pager having a default set of functions for the accessing steps, comprising:

receiving a memory object reference request with a set of function defining flags, each flag corresponding to one of said accessing steps, each flag indicating whether a default pager function or a customized pager function is to be used for accessing a data set for a memory object;

linking a given function defining flag for a customized pager function in said set of flags with a customized function specified by a physical file system (PFS), to replace a corresponding one of said default functions in a corresponding accessing step of said pager, and making said given flag part of said memory object's pager attributes; and dynamically overriding said corresponding one of said default functions in said corresponding accessing step of said pager when accessing said data set for said memory object, in response to said given flag.

12. In a computer memory, a method to customize accessing steps to be performed in an access method by a file server's pager in accessing a data set on a file server for a specific memory object in the memory, the steps being customized at a time that the data set is registered with the file server's pager for association with the specific memory object, the pager having a default set of functions for the accessing steps, comprising:

receiving a first memory object reference request with a first set of function defining flags, each flag corresponding to one of said accessing steps, each flag indicating whether a default pager function or a customized pager function is to be used for accessing a data set for a first memory object;

receiving a second memory object reference request with a second set of function defining flags, each flag corresponding to one of said accessing steps, each flag indicating whether a default pager function or a customized pager function is to be used for accessing a data set for a second memory object;

linking a first given function defining flag for a customized pager function in said first set of flags with a first customized function specified by a first physical file system (PFS), to replace a corresponding first one of said default functions in a corresponding first accessing step of said pager, and making said first given flag part of said first memory object's pager attributes;

linking a second given function defining fag for a customized pager function in said second set of flags with a second customized function specified by a second physical file system (PFS), to replace a corresponding second one of said default functions in a corresponding second accessing step of said pager, and making said second given flag part of said second memory object's pager attributes;

dynamically overriding said corresponding first one of said default functions in said corresponding first accessing step of said pager when accessing said data set for said first memory object, in response to said first given flag; and dynamically overriding said corresponding second one of said default functions in said corresponding second accessing step of said pager when accessing said data set for said second memory object, in response to said second given flag.

* * * * *

UNITED STATES PATENT AND TRADEMARK OFFICE
CERTIFICATE OF CORRECTION

PATENT NO.   :   6,023,711
DATED        :   February 8, 2000
INVENTOR(S)  :   Craig A. Bennett et al.

It is certified that error appears in the above-identified patent and that said Letters Patent is hereby corrected as shown below:

<u>Column 14</u>

Line 10, please change "fag" to --flag--.

Signed and Sealed this

Seventeenth Day of April, 2001

Attest:

NICHOLAS P. GODICI

Attesting Officer     Acting Director of the United States Patent and Trademark Office